United States Patent
Liu et al.

(10) Patent No.: US 9,043,538 B1
(45) Date of Patent: May 26, 2015

(54) MEMORY SYSTEM AND METHOD FOR CONTROLLING NONVOLATILE MEMORY

(71) Applicant: Nationz Technologies Inc., Shenzhen, Guangdong (CN)

(72) Inventors: Juan Liu, Guangdong (CN); Fengqin Zhou, Guangdong (CN); Mingxiang Zi, Guangdong (CN)

(73) Assignee: Nationz Technologies Inc., Shenzhen, Guangdong (CN)

( * ) Notice: Subject to any disclaimer, the term of this patent is extended or adjusted under 35 U.S.C. 154(b) by 0 days.

(21) Appl. No.: 14/311,221

(22) Filed: Jun. 20, 2014

(30) Foreign Application Priority Data

| Dec. 30, 2013 | (CN) | 2013 1 0746199 |
| Dec. 30, 2013 | (CN) | 2013 1 0746987 |
| Jan. 7, 2014 | (CN) | 2014 1 0007080 |
| Nov. 4, 2014 | (CN) | 2014 1 0016444 |

(51) Int. Cl.
*G06F 12/00* (2006.01)
*G06F 12/02* (2006.01)
*G06F 12/08* (2006.01)

(52) U.S. Cl.
CPC ........ *G06F 12/0246* (2013.01); *G06F 12/0802* (2013.01); *G06F 2212/7201* (2013.01)

(58) Field of Classification Search
USPC .......................................................... 711/103
See application file for complete search history.

(56) References Cited

U.S. PATENT DOCUMENTS

| 2008/0086585 | A1* | 4/2008 | Fukuda et al. | 711/100 |
| 2009/0249173 | A1* | 10/2009 | Torigoe et al. | 714/801 |
| 2010/0318733 | A1* | 12/2010 | Seo et al. | 711/106 |
| 2011/0055457 | A1* | 3/2011 | Yeh | 711/103 |
| 2011/0231598 | A1* | 9/2011 | Hatsuda | 711/103 |
| 2012/0278541 | A1* | 11/2012 | Yamaki | 711/103 |

* cited by examiner

*Primary Examiner* — Charles Rones
*Assistant Examiner* — Nanci Wong

(57) ABSTRACT

A memory system comprises a master control module, a memory control module, a nonvolatile memory and a cache, wherein the memory control module is connected with the master control module, the nonvolatile memory and the cache are respectively connected with the memory control module; and the memory control module is configured to, when the master control module sends a write command for the nonvolatile memory, store data to be written in the nonvolatile memory in the cache according to the write command, and release the cache used for storing the data to be written in the nonvolatile memory after finish of the write operation to the nonvolatile memory.

14 Claims, 10 Drawing Sheets

MEMORY SYSTEM AND METHOD FOR CONTROLLING NONVOLATILE MEMORY

CROSS REFERENCE OF RELATED APPLICATION

The present invention claims priority under 35 U.S.C. 119 (a-d) to CN 201310746199.8, filed Dec. 30, 2013; CN 201310746987.7, filed Dec. 30, 2013; CN 201410007080.3, filed Jan. 7, 2014; and CN 201410016444.4, filed Jan. 14, 2014.

BACKGROUND OF THE PRESENT INVENTION

1. Field of Invention

The present invention relates to memory technologies, and in particular to memory systems and methods for controlling nonvolatile memory.

2. Description of Related Arts

With the rapid development of integrated circuit, the use of portable electronic products is becoming more and more widely, so that the development of a system-on-chip (SoC) is promoted. The system-on-chip referring to a complete system integrated on a single chip, generally includes central processing unit (CPU), read-only memory (ROM), random access memory (RAM), nonvolatile memory, such as Flash/EEPROM, and other functional modules. Among them, the RAM is a module which is the most frequently used and the most frequently interacts with the CPU in the system. The nonvolatile memory belongs to slow-speed memory, and especially the time consuming of write operation of the nonvolatile memory is quite long.

In the conventional technologies, a write cache is added to improve the system performance generally. When the write operation is to be performed to the nonvolatile memory, the data is first written into the write cache, so that the system can perform other operations. A nonvolatile memory controller at the same time writes the data in the write cache into the nonvolatile memory, in order to realize the write operation to the nonvolatile memory. Thus, through the cache effect of the write cache, the system can temporarily store the data to be written into the nonvolatile memory in the write cache rapidly, in order to perform other operations. Comparing with writing data to the nonvolatile memory directly, the write time of the system can be reduced, and the performance of the system is improved.

However, as the write operation to nonvolatile memory is not performed frequently, the corresponding write cache is in an idle state in most of the time, which renders the waste of resources.

SUMMARY OF THE PRESENT INVENTION

The technical problem to be solved by the present invention is to provide a memory system and a method for controlling nonvolatile memory, so as to improve the performance of the system as well as reduce the waste of resources, and increase the capacity of the system memory.

For solving the above technical problem, technical solutions provided by the present invention are as follow.

A memory system comprises a master control module, a memory control module, a nonvolatile memory and a cache, wherein the memory control module is connected with the master control module, the nonvolatile memory and the cache are respectively connected with the memory control module; and the memory control module is configured to, when the master control module sends a write command for the nonvolatile memory, store data to be written in the nonvolatile memory in the cache according to the write command, and release the cache used for storing the data to be written in the nonvolatile memory after finish of the write operation to the nonvolatile memory.

These and other objectives, features, and advantages of the present invention will become apparent from the following detailed description, the accompanying drawings, and the appended claims.

DETAILED DESCRIPTION OF THE PREFERRED EMBODIMENT

The present invention will be described in detail below with reference to drawings and embodiments.

Figure 1:
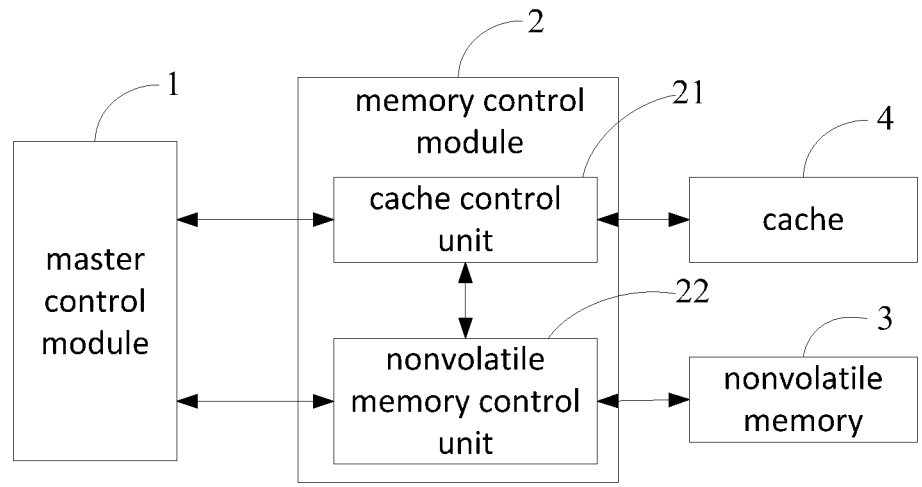
FIG. 1 is a diagram showing a structure of a memory system according to an embodiment of the present invention.

With reference to FIG. 1, in an embodiment of a memory system of the present invention, the memory system includes a master control module 1, a memory control module 2, a nonvolatile memory 3, and a cache 4. The memory control module 2 communicates with the master control module 1 through a bus. Wherein, the master control module 1 is CPU of the memory system. Wherein, the cache 4 in this embodiment may be implemented by a RAM 4 of the memory system.

When in need of processing a write operation to the nonvolatile memory 3, the master control module 1 initiates a write command toward the nonvolatile memory 3. The memory control module 2 receives the write command sent by the master control module 1, and temporarily stores data to be written into the nonvolatile memory in the cache 4 according to the write command. And a portion of the cache (i.e. system RAM in this embodiment) 4 for temporarily storing the data for the nonvolatile memory 3 may be a pre-specified cache, or a cache randomly allocated in the processing of the write operation in another embodiment. After the data for the nonvolatile memory 3 has been stored in the cache 4, or during the process of storing the data in the cache 4, the memory control module 2 reads the data stored in the cache 4 which needs to be written in the nonvolatile memory 3, and writes the read data into the nonvolatile memory 3, so as to realize the write operation to the nonvolatile memory 3. After the data in the cache 4 which needs to be written into the nonvolatile memory 3 has been written into the nonvolatile memory 3, the memory control module 2 sends a notification signal indicating that writing of the related data of the cache 4 into the nonvolatile memory 3 has been finished to the master control module 1, so as to notify the master control module 1 that the cache 4 used to store the data needed to be written into the nonvolatile memory 3 is available for serving as a system memory. Therefore the release of the cache 4 used to store the data needed to be written into the nonvolatile memory 3 is realized. Compared with the conventional technology, by using the RAM of the system as a cache module of the nonvolatile memory 3 during the write operation, and then releasing the corresponding RAM after the stored data for the nonvolatile memory 3 in the RAM 4 has been written into the nonvolatile memory 3, which enables that the master control module 1 may use that portion of RAM as system memory, the reuse of the system memory is realized. And waste of the memory resources is avoided. Moreover, it is not necessary to add a cache module of the nonvolatile memory 3, so that the area of a chip set is decreased, and the cost is reduced.

In another embodiment, in order to further improve system performance, after a part of the data for the nonvolatile memory 3 stored in the cache 4 has been written in to the nonvolatile memory 3, the memory control module 2 may send a notification signal indicating that this part of the data has been written into the nonvolatile memory 3, so as to notify the master control module 1 that the cache 4 for storing this part of the data can be used as system memory. The release of the cache 4 for storing this part of the data is therefore realized, without necessity of sending the notification signal that the writing of the data has been finished after the entire data has been read. Namely, at the same time of writing the data in the cache 4 into the nonvolatile memory 3, the cache 4 used for storing the data is released, wherein writing of the data has been finished. Certainly, the release of corresponding cache 4 may be after that the entire process of the write operation has been finished, or the release of corresponding cache 4 may be delayed a preset time, and after that the write operation to the nonvolatile memory 3 has been finished. The present invention does not limit herein.

Figure 2:
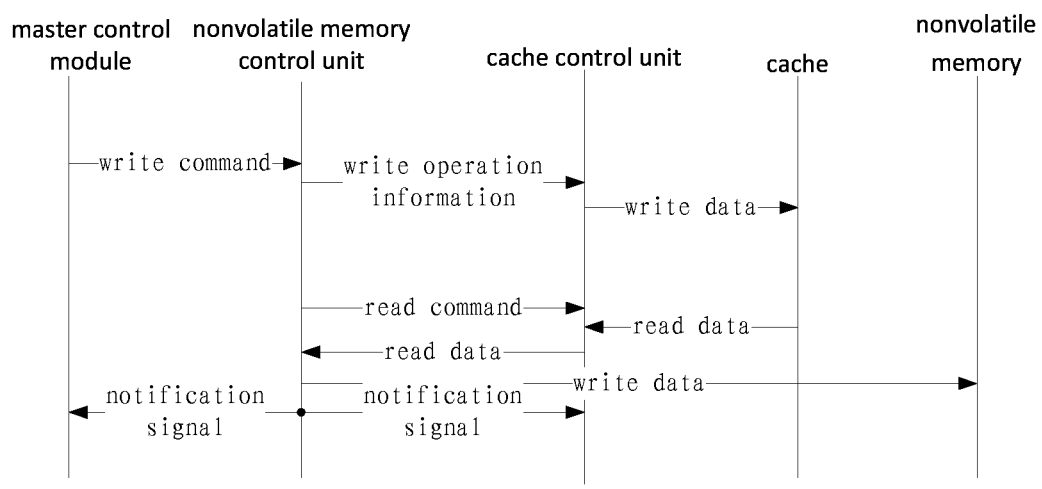
FIG. 2 is a diagram of signal and data flow in processing of write operation to a nonvolatile memory in the memory system as shown in FIG. 1.

With reference to FIG. 1 in combination of FIG. 2, the memory control module 2 of this embodiment includes a cache control unit 21 and a nonvolatile memory control unit 22. Wherein, when data is required to be written in the nonvolatile memory 3, the master control module 1 sends a write command. The nonvolatile memory control unit 22 receives the write command for the nonvolatile memory 3 sent by the master control module 1, and converts the write command to write time-sequence, so as to write the data in the nonvolatile memory 3 according to the write time-sequence in the subsequent process. Meanwhile, the nonvolatile memory control unit 22 sends write operation information to the cache control unit 21 according to the write command. The write operation information, for example, includes a write signal and address information of cache in which the data for the nonvolatile memory 3 is written. The cache control unit 21 stores the data to be written into the nonvolatile memory 3 in at least a part of cache 4 of the system according to the write operation information. After the cache control unit 21 writes the data into the corresponding cache 4, the nonvolatile memory control unit 22 sends a read command of reading the data stored in the cache 4 which is needed to be written in the nonvolatile memory 3 to the cache control unit 21. Alternatively, the read command may also be sent by the nonvolatile memory control unit 22 during the cache control unit 21 writing the data into the cache 4. The cache control unit 21 reads the data stored in the cache 4 which is needed to be written in the nonvolatile memory 3 according to the read command, and sends the read data to the nonvolatile memory control unit 22, so that the nonvolatile memory control unit 22 writes the received data into the nonvolatile memory 3. Then the write operation to the nonvolatile memory 3 is realized. Besides, after the nonvolatile memory control unit 22 writes the data stored in the cache 4, which is needed to be written in the nonvolatile memory 3, in the nonvolatile memory 3, the nonvolatile memory control unit 22 sends the notification signals notifying that the corresponding data has been written in the nonvolatile memory 3 to both the master control module 1 and the cache control unit 21, so as to notify the master control module 1 that the cache 4 used to store the data which is needed to be written to the nonvolatile memory 3 may be continued to be used as system memory, and to notify the cache control unit 21 that the cache control unit 21 no longer needs to receive the command from the nonvolatile memory control unit 22, which realizes the release of the cache 4 used to store the data of the nonvolatile memory 3. Hence, write access to the nonvolatile memory is realized by a sufficient usage of system RAM. While providing the performance of the system, there is no need for an extra addition of write cache module of the nonvolatile memory, and the area of chip-set is decreased.

Should know, in another embodiment, the cache control unit 21 and a nonvolatile memory control unit 22 can be implemented by being integrated on a same control circuitry.

Figure 3:
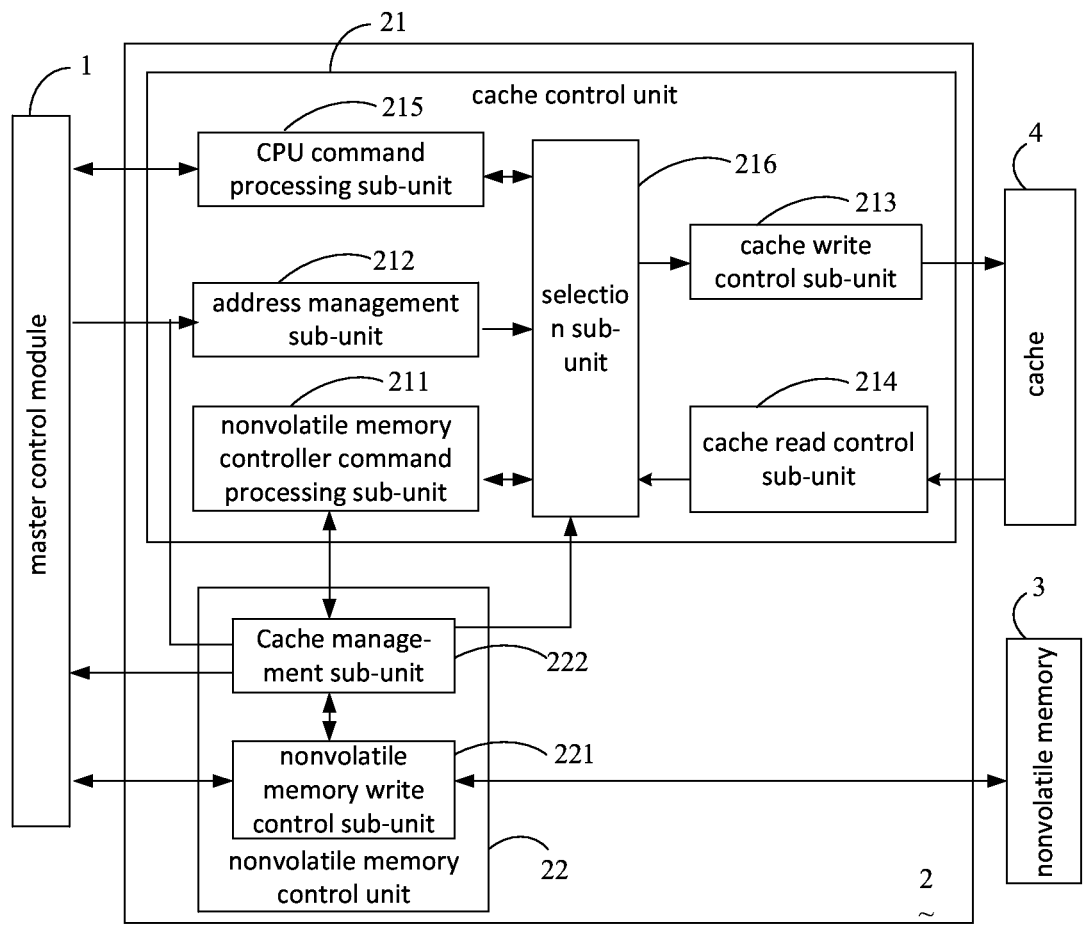
FIG. 3 is a specific diagram showing the structure of the memory system as shown in FIG. 1.
Figure 4:
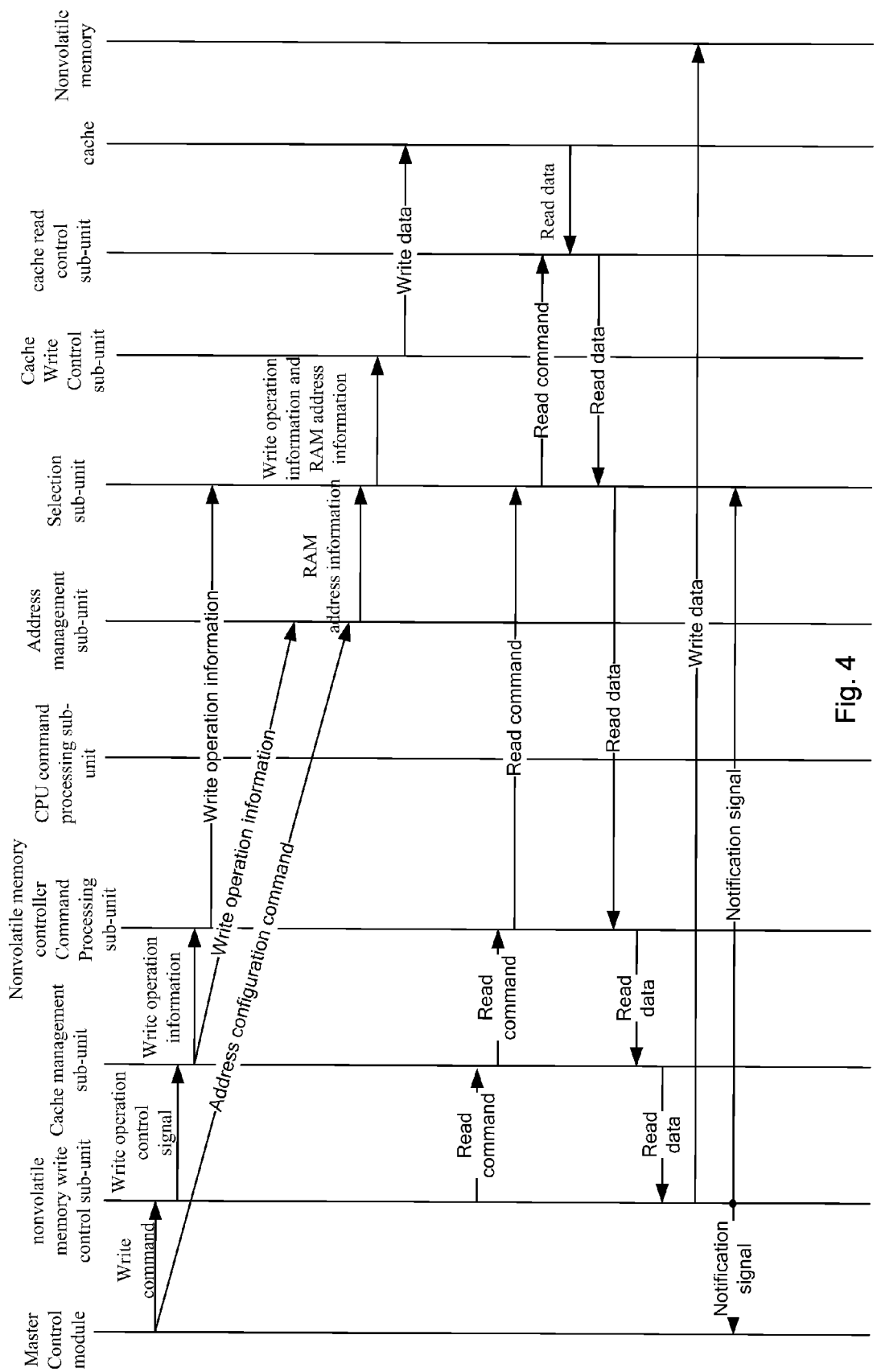
FIG. 4 is a diagram of signal and data flow in the processing of write operation to the nonvolatile memory in the memory system as shown in FIG. 3.

Further, with reference with FIG. 3 in combination of FIG. 4, in this embodiment, the nonvolatile memory control unit 22 includes a nonvolatile memory write control sub-unit 221 and a cache management sub-unit 222. The cache control unit 21 includes a nonvolatile memory controller command processing sub-unit 211, an address management sub-unit 212, a cache write control sub-unit 213, and a cache read control sub-unit 214. Moreover, the cache control unit 21 receives not only the command from the nonvolatile memory control unit 22, but also the command from the master control module 1. Therefore, the cache control unit 21 of this embodiment further includes a CPU (Central Processing Unit) command processing sub-unit 215 and a selection sub-unit 216. The CPU command processing sub-unit 215 is configured to receive the command from the master control module 1. The selection sub-unit 216 alternatively selects, according to whether the nonvolatile memory is in the write operation period, the command from the nonvolatile memory control unit 22 or the master control module 1 and sends the selected command to the cache read control sub-unit 214. Namely, the selection sub-unit 216 alternatively selects the command from the CPU command processing sub-unit 215 or the nonvolatile memory controller command processing sub-unit 211, and selects and returns the data read by the cache read control sub-unit 214.

When the master control module 1 initiates the write command to the nonvolatile memory 3, the nonvolatile memory controller command processing sub-unit 211 receives the write command to the nonvolatile memory 3 sent from the system, converts the write command to write time-sequence for processing the write operation, and sends a write operation control signal to the cache management sub-unit 222. The cache management sub-unit 222 sends the write operation information to the cache control unit 21 according to the write operation control signal sent by the nonvolatile memory write control sub-unit 221. The write operation information includes a write signal and address information of cache in which the data for the nonvolatile memory 3 is written. In the cache control unit 21, the nonvolatile memory controller command processing sub-unit 211 is configured to receive the write operation information sent by the cache management sub-unit 222. The selection sub-unit 216 selects the write operation information from the nonvolatile memory write control sub-unit 221, and sends the selected write operation information to the cache write control sub-unit 213. The address management sub-unit 212 is configured to receive an address configuration command of the cache for storing the data which is needed to be written in the nonvolatile memory 3 sent from the master control module 1 when the master control module 1 sends the write command for the nonvolatile memory 3, and to receive the write operation information from the cache management sub-unit 222, so as to generate the cache address information according to the write operation information and the address configuration command. The cache address information includes address of the part of the cache configured to store the data of the nonvolatile memory 3 within the entire system RAM 4, which is base address, and address at where the data of the nonvolatile memory 3 stores within the part of the RAM, which is offset address. During the write operation period of the nonvolatile memory, the selection sub-unit 216 selects the corresponding cache address to send to the cache write control sub-unit 213. The cache write control sub-unit 213 stores the data which is needed to be written in the nonvolatile memory 3 in the corresponding cache according to the write operation information and the cache address information from the selection sub-unit 216. After the cache write control sub-unit 213 writes the data in the corresponding cache 4, the nonvolatile memory write control sub-unit 221 sends a read command for reading the data stored in the cache 4 which is needed to be written in the nonvolatile memory 3 to the cache management sub-unit 222, so as to send the read command through the cache management sub-unit 222 to the nonvolatile memory controller command processing sub-unit 211. The selection sub-unit 216 selects the read command from the nonvolatile memory controller command processing sub-unit 211, and sends the read command to the cache read control sub-unit 214. The cache read control sub-unit 214 reads the data which is needed to be written in the nonvolatile memory 3 according to the read command. The selection sub-unit 216 selects to return the data read by the cache read control sub-unit 214 to the nonvolatile memory controller command processing sub-unit 211, so as to send the data through the nonvolatile memory controller command processing sub-unit 211 to the cache management sub-unit 222. The cache management sub-unit 222 sends the received data to the nonvolatile memory write control sub-unit 221, so that the nonvolatile memory write control sub-unit 221 writes the data into the nonvolatile memory 3 to achieve the write operation to the nonvolatile memory 3.

After the nonvolatile memory write control sub-unit 221 writes the data of the nonvolatile memory 3 stored in the cache into the nonvolatile memory 3, the cache management sub-unit 222 sends, according to the write operation status of the nonvolatile memory write control sub-unit 221 which is finish of writing the data in the nonvolatile memory, the notification signals notifying that the data of the nonvolatile memory 3 has been written in the nonvolatile memory 3 to both the master control module 1 and the selection sub-unit 216, so as to notify the master control module 1 that the cache 4 used to store the data which is needed to be written to the nonvolatile memory 3 may be continued to be used as system memory, and to notify that the selection sub-unit 216 that the selection sub-unit 216 no longer needs to select the command from the nonvolatile memory controller command processing sub-unit 211. Therefore, the release of the cache for storing the data of the nonvolatile memory 3 is realized.

In this embodiment, by using the system RAM 4 as a cache of the nonvolatile memory 3 during the write operation period, and by releasing the cache 4 used for storing the data which is needed to be written in the nonvolatile memory 3 after the data stored in the cache 4 which is needed to be written in the nonvolatile memory 3 has been written in the nonvolatile memory 3, which results that this part of the cache 4 may be serve as system memory, the system performance is enhanced, the reuse of system memory resources is achieved, and the waste of the memory resources is reduced. And, because there is no need for an extra addition of write cache module, the area of chip-set is decreased, which benefits for cost reduction. Certainly, in another embodiment, the release of the cache may be after that the entire process of the write operation of the nonvolatile memory has been finished, which is not limited here.

Figure 5:
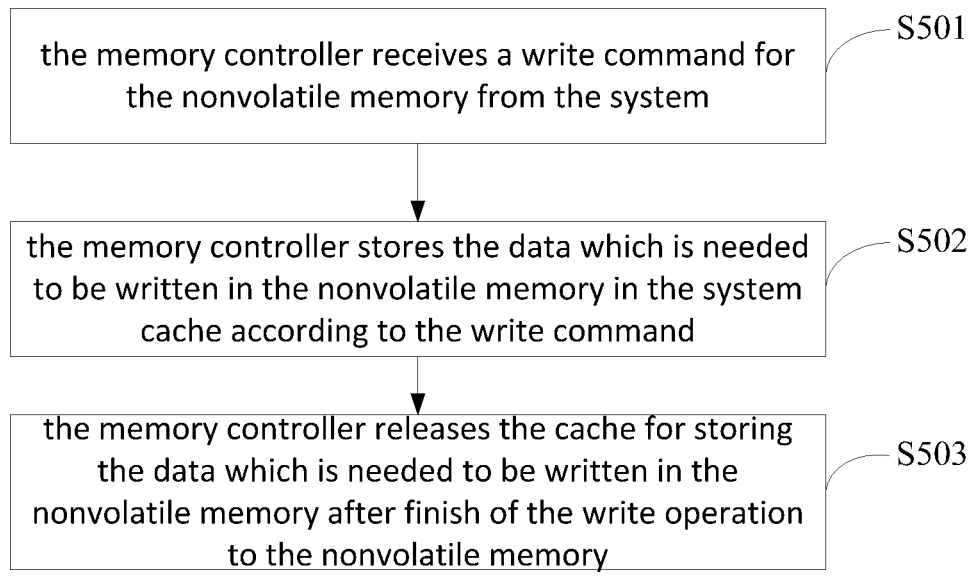
FIG. 5 is a flow chart of a method for controlling the nonvolatile memory of the memory system according to an embodiment of the present invention.

With reference to FIG. 5, in an embodiment of the method for controlling the nonvolatile memory of the present invention, the memory system includes memory controller configured to control the nonvolatile memory. The nonvolatile memory is connected with the memory controller, and the memory controller is connected with the CUP of the system, so as to receive instructions from the CUP. The method includes the following steps.

Step S501, the memory controller receives a write command for the nonvolatile memory from the system.

The memory controller is configured to control the access of the nonvolatile memory. When the CPU of the system needs to conduct a write operation to the nonvolatile memory, the memory controller receives the write command from the system, so as to conduct the write operation to the nonvolatile memory according to the write command.

Step S502, the memory controller stores the data which is needed to be written in the nonvolatile memory in the cache according to the write command.

The nonvolatile memory is slow-speed memory. In this embodiment, during the write operation period of the nonvolatile memory, a part of the system memory is divided for serving as a write cache of the nonvolatile memory. The data which is needed to be written in the nonvolatile memory is firstly stored in this part of the RAM, so that the data can be rapidly stored via the effect of the RAM. Therefore, the system performance is enhanced.

Step S503, the memory controller releases the cache for storing the data which is needed to be written in the nonvolatile memory after finish of the write operation to the nonvolatile memory.

After the memory controller writes the data of the nonvolatile memory stored in the cache into the nonvolatile memory, the memory controller releases this part of the cache, so that the CPU of the system may be continued to use this part of the cache, i.e. system RAM in this embodiment, as the system memory; through which, while enhancing the system performance, the reuse of the system memory is realized, and the waste of the memory resources can be avoided. There is no need to extra add a cache for the nonvolatile memory, so that the area of the chip-set can be reduced, which benefits for the cost reduction.

Wherein, in this embodiment, the memory controller includes a nonvolatile memory control unit and a cache control unit.

Figure 6:
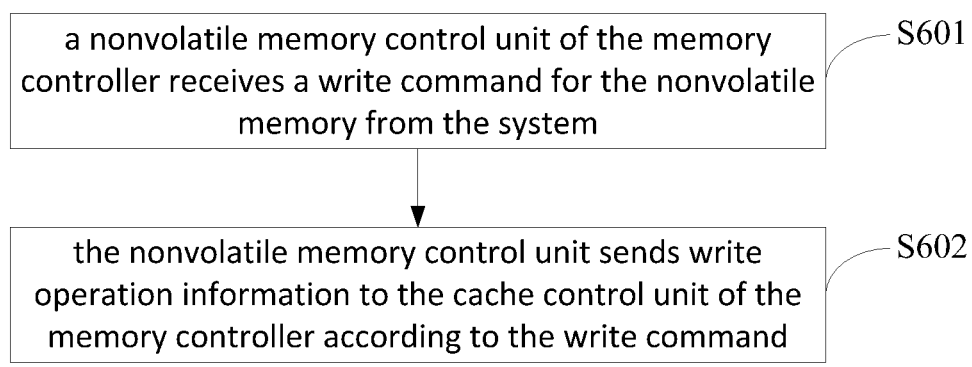
FIG. 6 is a flow chart of a memory controller receiving a write command from a system for the nonvolatile memory in a method for controlling the nonvolatile memory of the memory system according to an embodiment of the present invention.

With reference to FIG. 6, the step that the memory controller receives a write command for the nonvolatile memory from the system further includes the following steps.

Step S601, a nonvolatile memory control unit of the memory controller receives a write command for the nonvolatile memory from the system.

The nonvolatile memory control unit is configured to control the access operation to the nonvolatile memory and receive the write command for the nonvolatile memory from the system. Further, the nonvolatile memory control unit includes a nonvolatile memory write control sub-unit and a cache management sub-unit. The nonvolatile memory write control sub-unit receives the write command for the nonvolatile memory from the system, and sends a write operation control signal to the cache management sub-unit.

Step S602, the nonvolatile memory control unit sends write operation information to the cache control unit of the memory controller according to the write command.

Specifically, after the cache management sub-unit receives the write operation control signal sent by the nonvolatile memory write control sub-unit, the cache management sub-unit sends write operation information to the cache control unit according to the write operation control signal.

Thereby, the cache control unit stores the data which is needed to be written in the nonvolatile memory in the cache according to the write operation information. The cache control unit is configured to control the access operation of the cache. When processing the write operation to the nonvolatile memory, the data which is needed to be written in the nonvolatile memory is rapidly stored in the cache through the cache control unit, so as to enhance the system performance.

Figure 7:
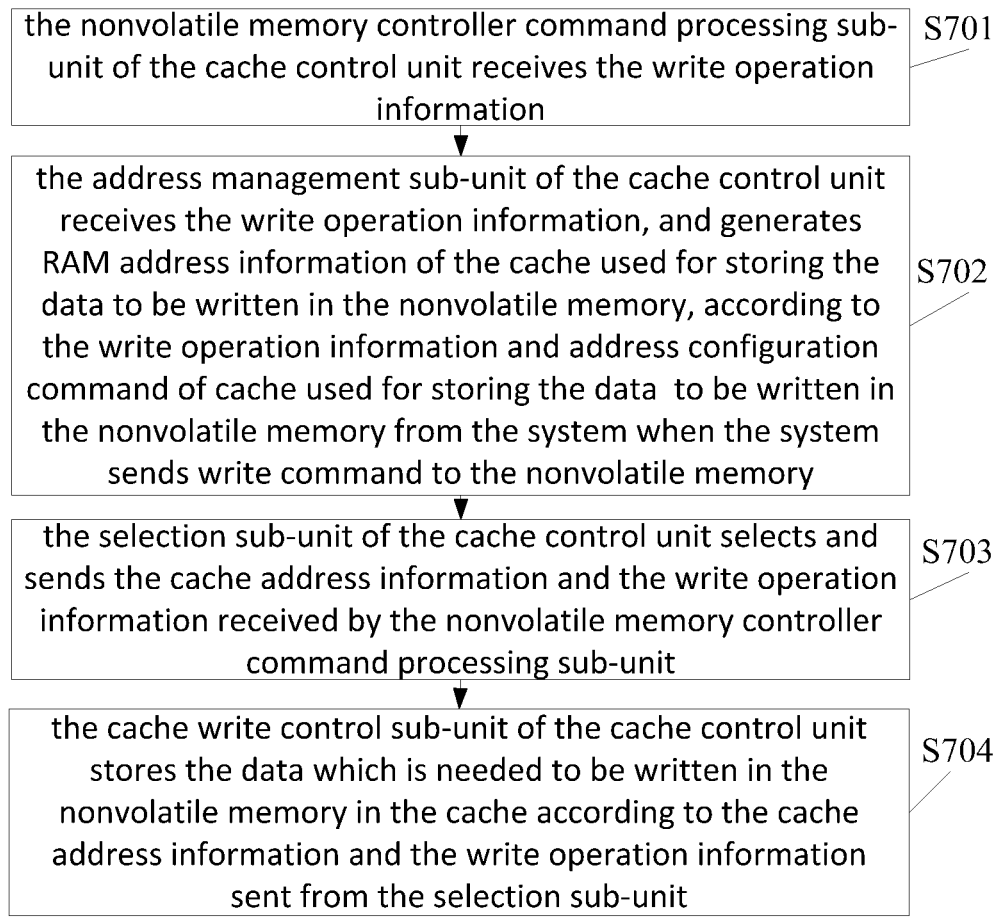
FIG. 7 is a flow chart showing that a cache controlling unit stores, according to write operation information, data needed to be written into the nonvolatile memory in the cache in a method for controlling the nonvolatile memory of the memory system according to an embodiment of the present invention.

Further, the cache control unit includes a nonvolatile memory controller command processing sub-unit, an address management sub-unit, a cache write control sub-unit, a cache read control sub-unit, a CPU command processing sub-unit and a selection sub-unit. Hence, with reference to FIG. 7, the step that the cache control unit stores the data which is needed to be written in the nonvolatile memory in the system cache according to the write operation information further includes the following steps.

Step S701, the nonvolatile memory controller command processing sub-unit of the cache control unit receives the write operation information.

The nonvolatile memory controller command processing sub-unit is configured to receive the signal from the nonvolatile memory control unit.

Step S702, the address management sub-unit of the cache control unit receives the write operation information, and generates cache address information of the cache used for storing the data which is needed to be written in the nonvolatile memory, according to the write operation information and address configuration command of cache used for storing the data which is needed to be written in the nonvolatile memory from the system when the system sends write command to the nonvolatile memory.

Wherein, the cache address information includes address of the part of the cache configured to store the data of the nonvolatile memory 3 within the entire system cache 4, i.e., base address, and address at where the data of the nonvolatile memory 3 stores within the part of the cache, i.e., offset address.

Step S703, the selection sub-unit of the cache control unit selects and sends the cache address information and the write operation information received by the nonvolatile memory controller command processing sub-unit.

The cache control unit receives not only the command from the nonvolatile memory control unit, but also the command from the CPU of the system. The CPU command processing sub-unit of the cache control unit is configured to receive the command from the CPU. The selection sub-unit alternatively selects, according to whether the nonvolatile memory is within the write operation period, one command from the nonvolatile memory control unit or CPU, and send the selected command to the cache write control sub-unit. That is to alternatively select one command from the CPU command processing sub-unit and the nonvolatile memory controller command processing sub-unit and select the data read by the cache read control sub-unit to return.

Step S704, the cache write control sub-unit of the cache control unit stores the data which is needed to be written in the nonvolatile memory in the cache according to the cache address information and the write operation information sent from the selection sub-unit.

Through the above steps, the cache control unit realizes writing the data which is needed to be written in the nonvolatile memory in the cache.

Figure 8:
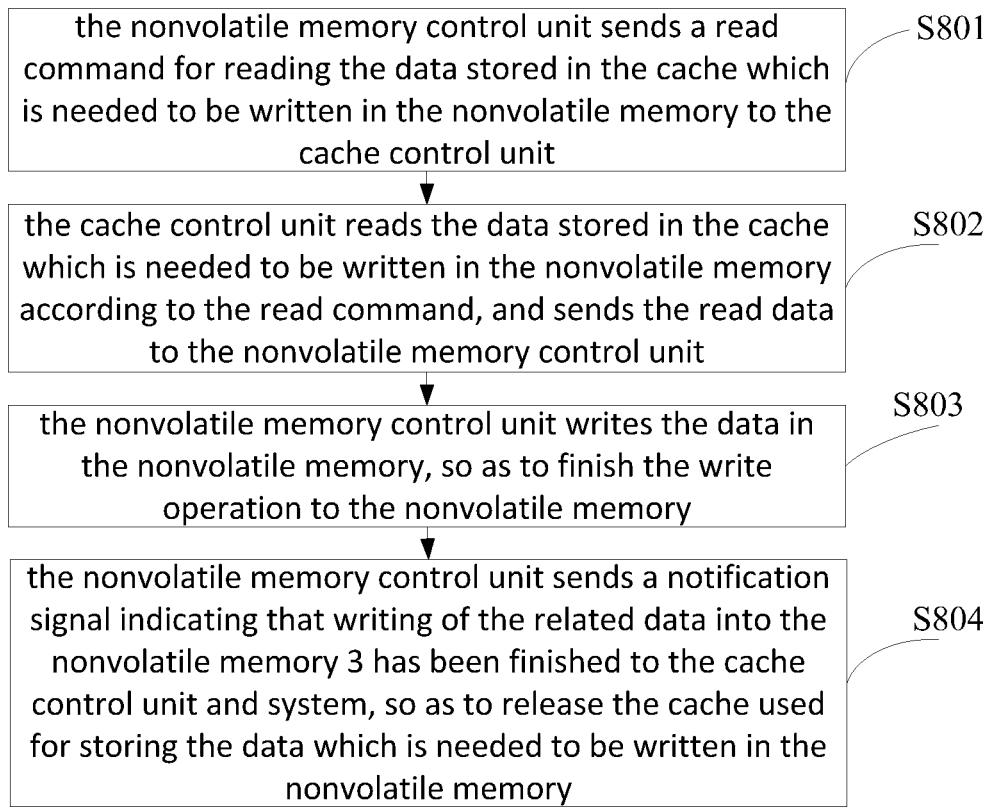
FIG. 8 is a flow chart of showing that the cache controlling unit releases, after finish of the write operation to the nonvolatile memory, the cache used for storing data needed to be written into the nonvolatile memory, in a method for controlling the nonvolatile memory of the memory system according to an embodiment of the present invention.

Wherein, with reference to FIG. 8, in this embodiment, the step that the memory releases at least a part of cache after the finish of the write operation to the nonvolatile memory, specifically includes the following steps.

Step S801, the nonvolatile memory control unit sends a read command for reading the data stored in the cache which is needed to be written in the nonvolatile memory to the cache control unit.

Specifically, after the cache control unit writes the data which is needed to be written into the nonvolatile memory in the nonvolatile memory, the nonvolatile memory write control sub-unit of the nonvolatile memory control unit sends a read command for reading the data stored in the cache which is needed to be written in the nonvolatile memory to the cache management sub-unit. The cache management sub-unit receives the read command, and sends the read command to the nonvolatile memory controller command processing sub-unit of the cache control unit.

Step S802, the cache control unit reads the data stored in the cache which is needed to be written in the nonvolatile memory according to the read command, and sends the read data to the nonvolatile memory control unit.

Figure 9:
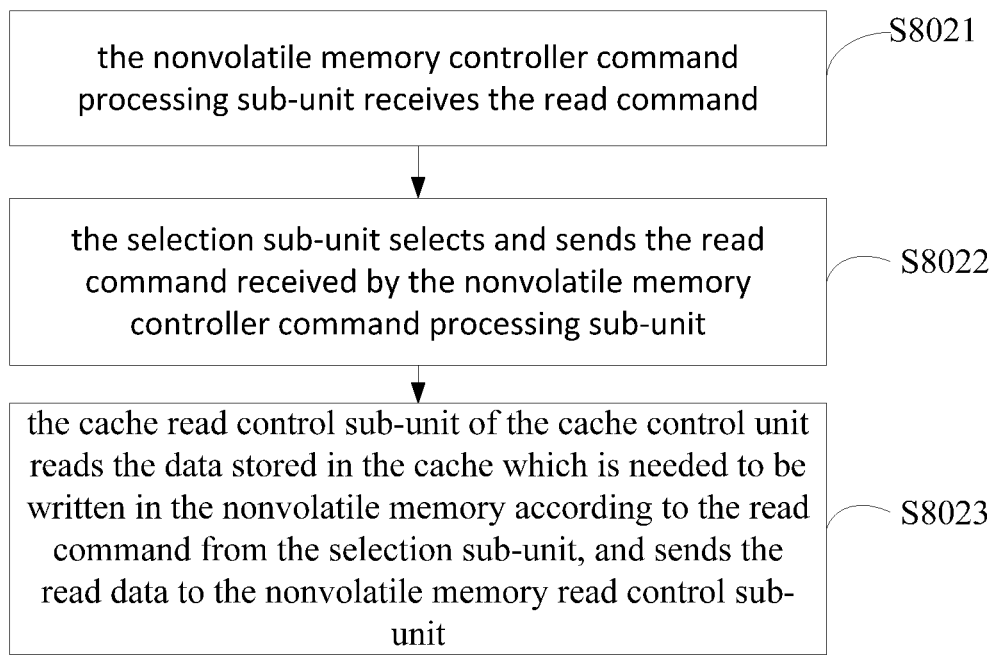
FIG. 9 is a flow chart showing that the cache controlling unit reads, according to read command, data needed to be written into the nonvolatile memory stored in the cache, and sends the read data to the nonvolatile memory controlling unit, in a method for controlling the nonvolatile memory of the memory system according to an embodiment of the present invention.

Specifically, with reference to the FIG. 9, the step S802 further includes the following sub-steps.

Sub-step S8021, the nonvolatile memory controller command processing sub-unit receives the read command.

Sub-step S8022, the selection sub-unit selects and sends the read command received by the nonvolatile memory controller command processing sub-unit.

Sub-step S8023: the cache read control sub-unit of the cache control unit reads the data stored in the cache which is needed to be written in the nonvolatile memory according to the read command from the selection sub-unit, and sends the read data to the nonvolatile memory read control sub-unit.

After the cache read control sub-unit reads the data stored in the cache which is needed to be written in the nonvolatile memory, the selection sub-unit returns the data read by the cache read control sub-unit to the nonvolatile memory controller command processing sub-unit, so as to send the data to the cache management sub-unit through the nonvolatile memory controller command processing sub-unit. The cache management sub-unit sends the received data to the nonvolatile memory write control sub-unit.

Step S803, the nonvolatile memory control unit writes the data in the nonvolatile memory, so as to finish the write operation to the nonvolatile memory.

Specifically, the nonvolatile memory write control sub-unit writes the data in the nonvolatile memory.

Step S804, the nonvolatile memory control unit sends a notification signal indicating that writing of the related data into the nonvolatile memory 3 has been finished to the cache control unit and system, so as to release the cache used for storing the data which is needed to be written in the nonvolatile memory.

Specifically, after the nonvolatile memory write control sub-unit writes the data in the nonvolatile memory, the cache management sub-unit sends the notification indicating finish of writing the data in the nonvolatile memory to the selection sub-unit and system, so as to notify the selection sub-unit that the selection sub-unit no longer needs to select the command from the nonvolatile memory controller command processing sub-unit, and notify the CPU of the system that this part of the cache used for storing the data which is needed to be written in the nonvolatile memory may be continued to be used as system memory. Thereby, the cache used for storing the data which is needed to be written in the nonvolatile memory is released.

Figure 10:
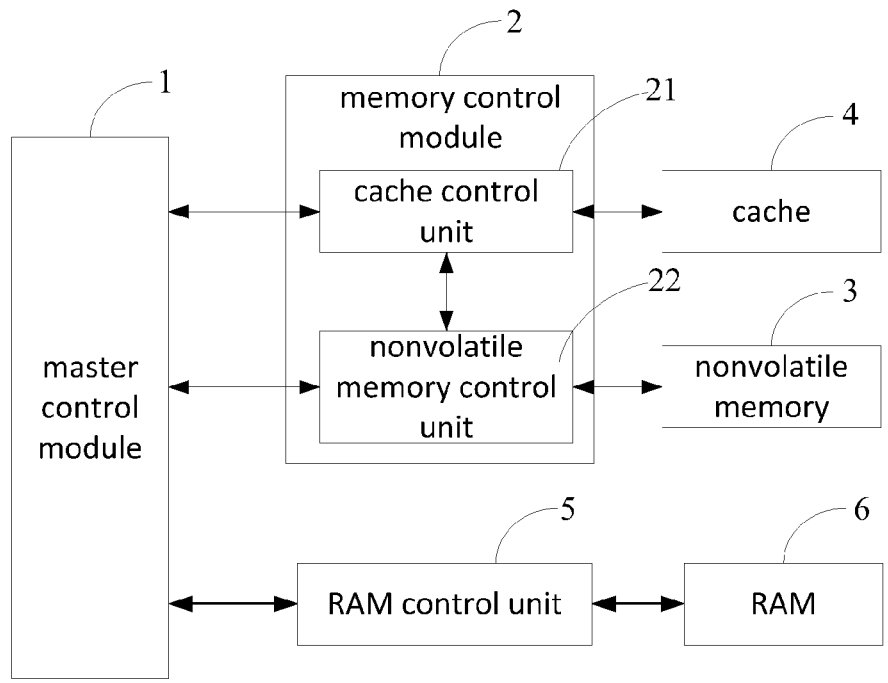
FIG. 10 is a diagram showing a structure of a memory system according to another embodiment of the present invention.

With reference to FIG. 10, in another embodiment of the memory system of the present invention, the memory system of this embodiment is different from the memory system corresponding to the FIG. 1. At that, a cache module 4' is extra added to replace the part of the RAM 4 used for storing the data which is needed to be stored in the nonvolatile memory. Accordingly, the RAM 6 which is connected with the master control module 1 through a RAM control module 5 is served as system memory. In still another embodiment, the RAM 6 may be also served as a cache of the nonvolatile memory together with the cache module 4. And in still another embodiment, the memory control unit 2 and the RAM control unit 5 may be implemented by a single control unit.

Figure 11:
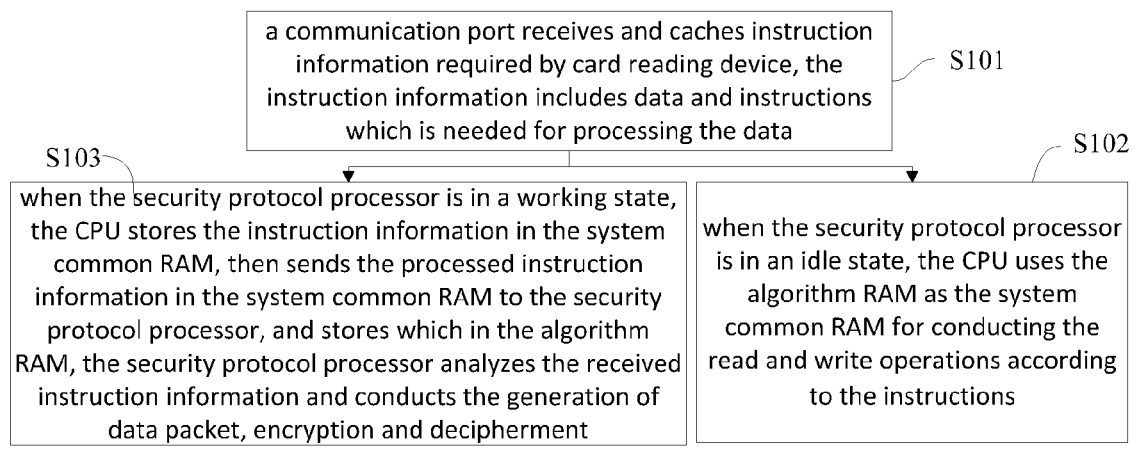
FIG. 11 is a flow chart of a method for processing data of a smart card provided by a first embodiment of the present invention.

FIG. 11 shows a flow chart of a method of processing data of a smart card provided by an embodiment of the present invention. For the convenience of description, only the related part of the embodiment of the present invention is shown.

With the continuous improvement of the degree of the social development, convenience and safety of consumption becomes a necessary requirement in people's daily life. Therefore, a safe smart card has been paid more and more attention in the market. The Smart card is a general name for plastic cards with embedded microchips, which is used to identify the cardholder without physical touch to any reader.

Wherein, a security smart card generally includes a CPU, a read only memory (ROM), a random-access memory (RAM), a nonvolatile memory (NVM), a security protocol processor, and other functional module. Wherein, a chip operating system (COS) is solidified in the ROM. The RAM in the system is divided into two parts, one part is a system common RAM of the system, and the other part is an algorithm RAM. The system common RAM mainly interacts with the CPU module. The algorithm RAM interacts with security protocol processor module. In the existing smart card, the responsibility of the system common RAM and the responsibility of the algorithm RAM are clearly distinguished and cannot replace each other. However, in the real implementation, the algorithm is not used all the time, but the demand for the system common RAM is relatively large. Therefore, the cost cannot be reduced by reducing the system common RAM.

In consideration with the above-mentioned problem, the method of processing data of a smart card provided by an embodiment of the present invention includes the following steps.

Step S101, a communication port receives and caches instruction information required by card reading device, and the instruction information includes data and instructions which is needed for processing the data.

Step S102, when the security protocol processor is in an idle state, the CPU uses the algorithm RAM as the system common RAM for conducting the read and write operations according to the instructions.

Step S103, when the security protocol processor is in a working state, the CPU stores the instruction information in the system common RAM, sends the processed instruction information in the system common RAM to the security protocol processor, and stores the instruction information in the algorithm RAM. The security protocol processor analyzes the received instruction information and conducts the generation of data packet, encryption and decipherment.

In this embodiment, the smart card includes communication ports, a CPU, a security protocol processor, a system common RAM, and an algorithm RAM. Wherein, each of the communication ports includes a cache, which is configured to cache the instruction information required by the card reading device. The card reading device may carry out the data interaction to implement the corresponding functions through the communication ports of the smart card. In this embodiment, the instruction information includes data and the instructions which are needed for processing the data. According to the wireless communication protocol, the card reading device sends the data and instructions needed for interaction to the smart card, and the smart card caches the data and instructions to the cache of the communication ports.

In this embodiment, the security protocol processor is a processing chip independent of the CPU and specialized responsible for the security process of the smart card data, which includes the generation of data packet, encryption, decipherment and so on. The security protocol processor may on one hand ensure the security of the data, and on the other hand relieve the burden of the CPU. In the existing smart card, the CPU generally interacts with the system common RAM, the security protocol processor generally interacts the algorithm RAM. When the security protocol processor is the idle state, the CPU cannot conduct a read/write operation to the algorithm RAM. However, in this embodiment, the CPU first obtains the current work state of the security protocol processor, for example, by reading the work state flag of the security protocol processor to judge the work state of the security protocol processor. When the security protocol processor is in the idle state, the CPU uses the algorithm RAM as the system common RAM, and conducts the read and write operations to the data in the system common RAM and the algorithm RAM according to the instructions. In this embodiment, because of using the algorithm RAM as the system common RAM in the idle state of the security protocol processor, the required capacity of the system common RAM may be reduced to a certain degree. Therefore, the solution of this embodiment is capable of reducing the chip area and the cost of the smart card.

Figure 12:
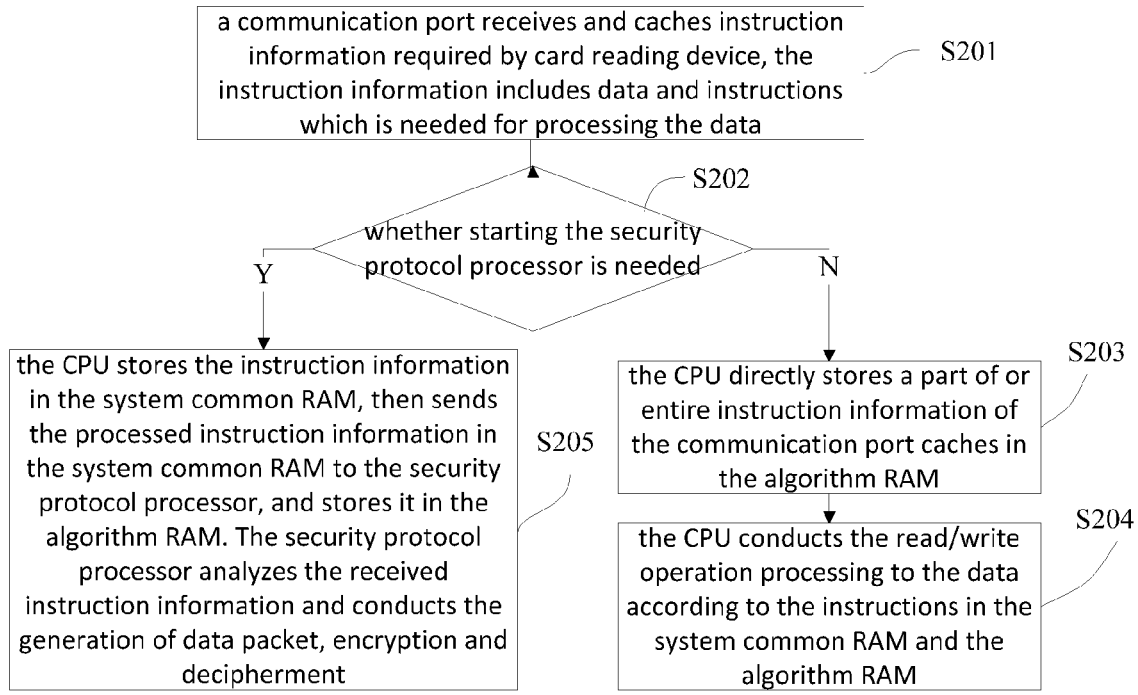
FIG. 12 is a flow chart of a method for processing data of a smart card provided by a second embodiment of the present invention.

FIG. 12 shows a flow chart of a method of processing data of a smart card provided by another embodiment of the present invention. For the convenience of description, only the related part of the embodiment of the present invention is shown.

The method of processing data of a smart card provided by this embodiment of the present invention includes the following steps.

Step S201, a communication port receives and caches instruction information required by card reading device, and the instruction information includes data and instructions which is needed for processing the data.

This step is in accordance with the step S101 of the previous embodiment.

Step S202, the CPU analyzes the instructions to judge whether starting the security protocol processor is needed.

The card reading device sends the data to be processed and the instructions required for processing the data to the communication port of the smart card. The CPU analyzes the instructions, and judges whether the related instructions which is needed to be processed by the security protocol processor exist. If the related instructions does not exist, there is no need to start the security protocol processor. Otherwise, it is needed to start the security protocol processor.

Step S203, when there is no need to start the security protocol processor, the CPU directly stores a part of or entire instruction information of the communication port caches in the algorithm RAM.

During the specific implementation, before the communication port receives the instruction information and the CPU processes the data, the security protocol processor is in the idle state, i.e. it does not work. The CPU directly retrieves a part of or entire instruction information and directly stores it in the algorithm RAM. Specifically, the CPU conducts the calculation and allocation processing according to the size of system information data flow and the size of instruction information data flow, stores a part of the instruction information in the system common RAM, and stores another part of the instruction information in the algorithm RAM. Certainly, it is also capable to store the entire instruction information in the algorithm RAM if the capacity of the algorithm RAM is larger than the required capacity.

Step S204, the CPU conducts the read/write operation processing to the data according to the instructions in the system common RAM and the algorithm RAM.

The CPU uses the algorithm RAM as the system common RAM. When using the algorithm RAM, the CPU directly conducts the read/write operation processing to the data according to the instructions in the system common RAM and the algorithm RAM.

Further, as a preferred embodiment, when the security protocol processor is in the idle state, the CPU stores a part of or entire system variables in the algorithm RAM.

Step S205, when it is needed to start the security protocol processor, the CPU stores the instruction information in the system common RAM, then sends the processed instruction information in the system common RAM to the security protocol processor, and stores it in the algorithm RAM. The security protocol processor analyzes the received instruction information and conducts the generation of data packet, encryption and decipherment.

When it is needed to start the security protocol processor, the security protocol processor directly analyzes the instructions stored in the algorithm RAM, and conducts the generation of data packet, encryption and decipherment according to the instructions. In this case, because the algorithm RAM is operated by the security protocol processor, which is the same as the normal condition, the CPU and the security protocol processor conduct the read/write operation processing to the data in the system common RAN and the algorithm RAM according to the respective instructions.

Based on the previous embodiment, this embodiment further discloses the detailed operations needed to carry out of the CPU, the security protocol processor, the system common RAM, the algorithm RAM and so on, when there is no need to start the security protocol processor. By using the algorithm RAM as the system common RAM, the required capacity of the system common RAM is reduced to a certain degree, so as to reduce the cost of the smart card.

In reference with FIG. 10 to FIG. 12, the memory system as shown in FIG. 10 may be a memory system of the smart card in the embodiments corresponding to FIG. 11 and/or FIG. 12, and may implement the method as shown in FIG. 11 and/or FIG. 12. The system common RAM may be the system RAM 6, and the algorithm RAM may be cache 4.

Figure 13:
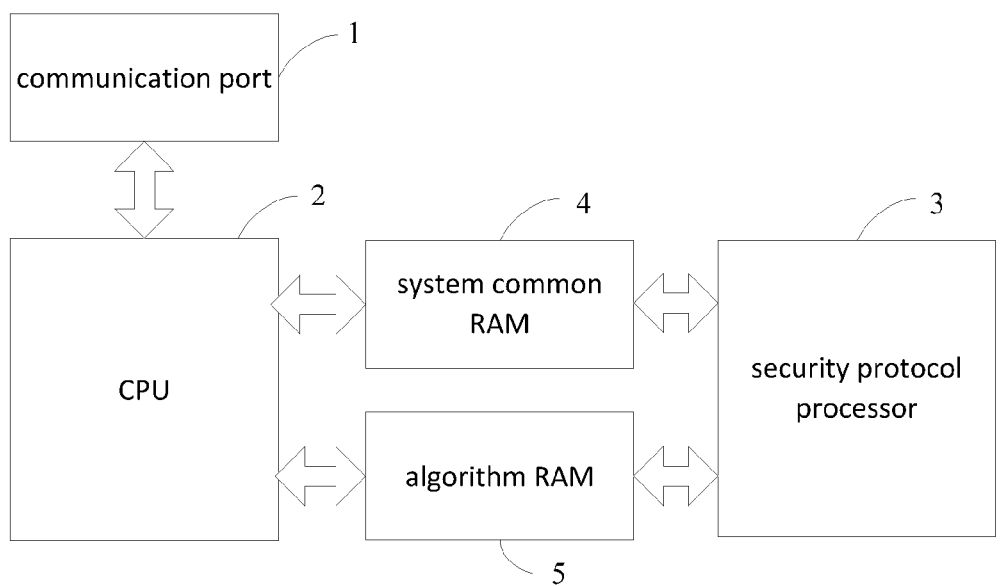
FIG. 13 is a diagram showing a structure of a smart card provided by a third embodiment of the present invention.

FIG. 13 shows a structural diagram of a smart card provided by the still another embodiment of the present invention. For the convenience of description, only the related part of the embodiment of the present invention is shown.

The smart card provided by this embodiment includes a communication port 1, a CPU 2, a security protocol processor 3, a system common RAM 4, and an algorithm RAM 5. Wherein, the communication port 1 is configured to cache the instruction information needed by the card reading device. The instruction information includes data and instructions for processing the data. The system common RAM 4 and the algorithm RAM 5 are configured to store the instruction information. The CPU is configured to use the algorithm RAM as the system common RAM when the security protocol processor is in an idle state and conducts the read/write operation processing to the data according to the instructions, and to store the instruction information in the system common RAM. Then the CPU sends the processed instruction information in the system common RAM to the security protocol processor, and stores the instruction information in the algorithm RAM. The algorithm RAM 3 is configured to analyze the received instruction information and conduct the generation of data packet, encryption and decipherment.

In the existing smart card, the CPU generally interacts with the system common RAM, and the security protocol processor generally interacts the algorithm RAM. When the security protocol processor is the idle state, the CPU cannot conduct a read/write operation to the algorithm RAM. However, in this embodiment, the CPU first obtains the current work state of the security protocol processor, for example, by reading the work state flag of the security protocol processor to judge the work state of the security protocol processor. When the security protocol processor is in the idle state, the CPU uses the algorithm RAM as the system common RAM, and conducts the read and write operations to the data in the system common RAM and the algorithm RAM according to the instructions.

In this embodiment, because of using the algorithm RAM as the system common RAM in the idle state of the security protocol processor, the required capacity of the system common RAM may be reduced to a certain degree. Therefore, the solution of this embodiment is capable of reducing the chip area and the cost of the smart card.

In the specific implementation, preferably, the CPU analyzes the instructions to judge whether starting the security protocol processor is needed. When there is no need to start the security protocol processor, the CPU directly stores a part of or entire instruction information of the communication port caches in the algorithm RAM. The CPU conducts the read/write operation processing to the data according to the instructions in the system common RAM and the algorithm RAM. When it is needed to start the security protocol processor, the CPU stores the instruction information in the system common RAM, then sends the processed instruction information in the system common RAM to the security protocol processor, and stores it in the algorithm RAM. The security protocol processor analyzes the received instruction information and conducts the generation of data packet, encryption and decipherment. Preferably, when the security protocol processor is in the idle state, the CPU stores a part of or entire system variables in the algorithm RAM.

Figure 14:
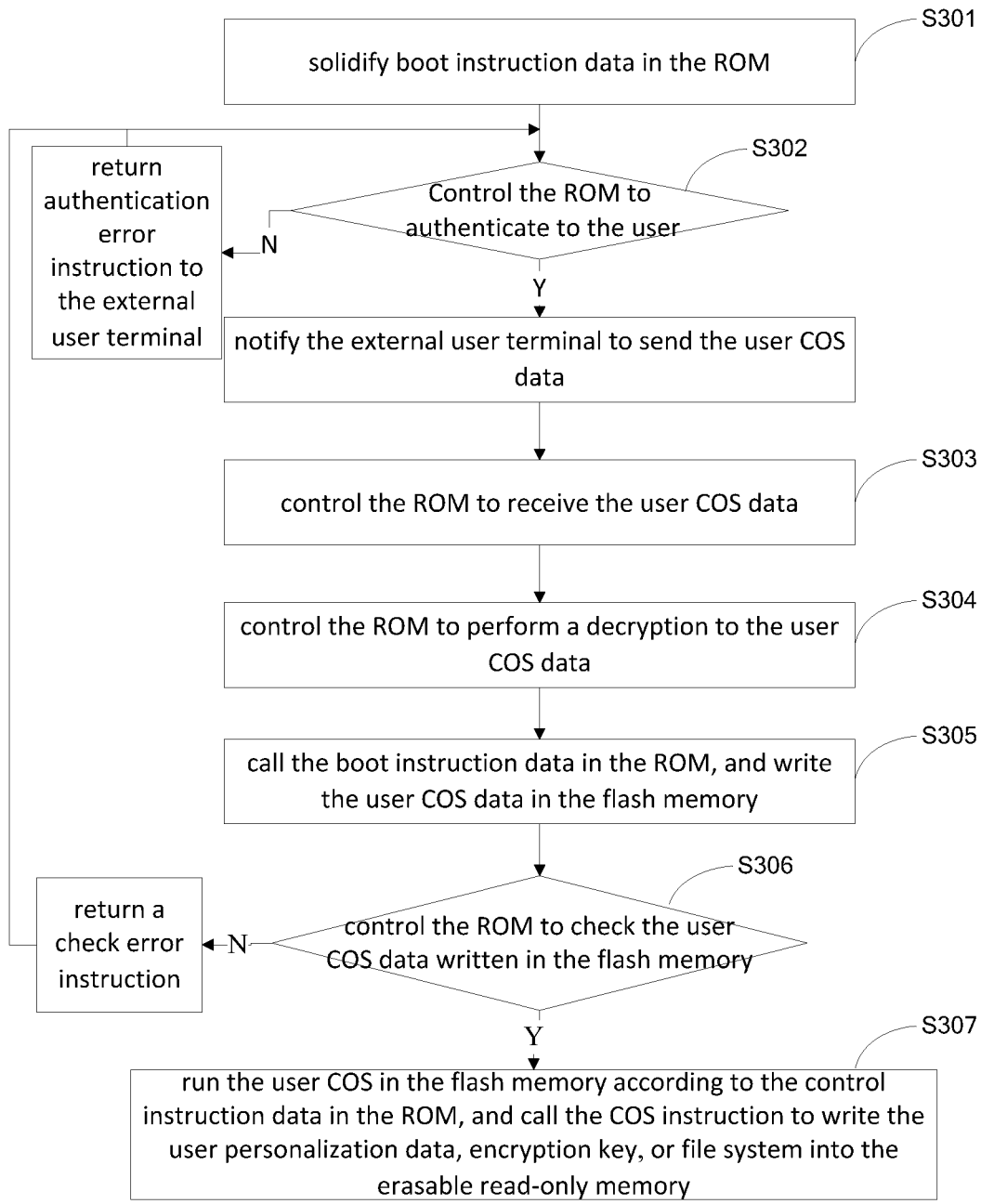
FIG. 14 is a flow chart of a method for controlling initialization of a smart card provided by an embodiment of the present invention.

FIG. 14 shows a flow chart of a method for controlling initialization of smart card provided by an embodiment of the present invention. The method is detailed described as below.

Step S301, solidify boot instruction data in the ROM.

Solidify the boot instruction data, control instruction data, API (Application Program Interface) function in the ROM. The boot instruction data is used for, when receiving a user COS data, an encryption algorithm related to security and authentication, and a dynamic program, booting to download it to a flash memory. The control instruction data is used for controlling the skip to the flash memory to run the user COS.

Step S302, control the ROM to authenticate to the user; if an encryption key input by an external user terminal passes the authentication, notify the external user terminal to send the user COS data; otherwise return authentication error instruction to the external user terminal.

When the user accesses the ROM, control the ROM to authenticate to the user. If the user passes the authentication, notify of sending the user COS data; otherwise return authentication error instruction.

Step S303, control the ROM to receive the user COS data.

When the user accessing the ROM has passed the authentication, control the ROM to receive the user COS data.

Step S304, control the ROM to perform a decryption to the user COS data.

Control the ROM to perform a decryption to the user COS data.

Step S305, call the boot instruction data in the ROM, and write the user COS data in the flash memory.

Call the boot instruction data in the ROM, and write the user COS data in the flash memory.

Step S306, control the ROM to check the user COS data written in the flash memory.

When the user COS is written in the flash memory, control the ROM to check the user COS data written in the flash memory. If pass the check, execute the next step. If fail to pass the check, return a check error instruction, and access the ROM again.

Step S307, run the user COS in the flash memory according to the control instruction data in the ROM, and call the COS instruction to write the user personalization data, encryption key, or file system into the erasable read-only memory.

For the user COS data passing the check, user may run the user COS in the flash memory according to the control instruction data in the ROM, and call the COS instruction to write the user personalization data, encryption key, or file system into the erasable read-only memory.

Further, call the API function in the ROM, simplify the user COS program code. When the user develops its own COS, it may use the API function, so as to simplify its own COS code.

Figure 15:
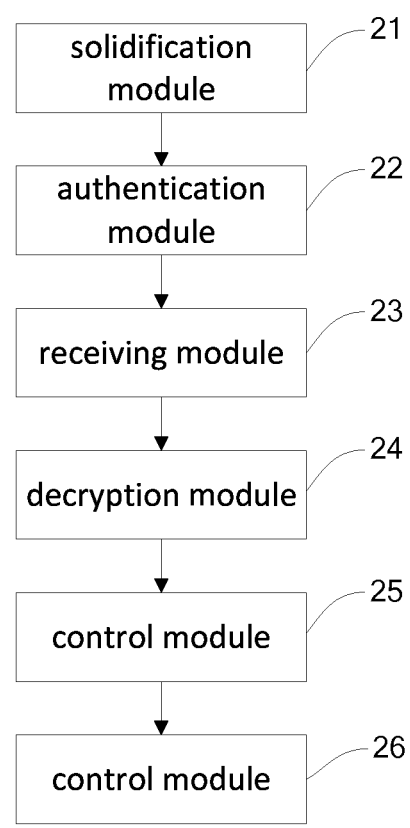
FIG. 15 is a structural diagram of an apparatus for controlling initialization of a smart card provided by an embodiment of the present invention.

FIG. 15 shows a structural diagram of an apparatus for controlling initialization of smart card provided by an embodiment of the present invention, which is detailed described as below.

An apparatus for controlling initialization of smart card includes: a solidification module 321 configured to solidify boot instruction data and the control instruction data in the ROM, an authentication module 322 configured to control the ROM to authenticate to the encryption key input by an external user terminal, a receiving module 323 configured to control the ROM to receive the user COS data, a decryption module 324 configured to control the ROM to perform a decryption to the user COS data, a control module 325 configured to call the boot instruction data in the ROM, write the user COS data in the flash memory, run the user COS in the flash memory according to the control instruction data in the ROM, and call the COS instruction to write the user personalization data, encryption key, or file system into the erasable read-only memory, and a check module 326 configured to control the ROM to check the user COS data written in the flash memory.

For the present method and apparatus for controlling initialization of smart card, by solidifying boot instruction data in the ROM, booting the user to write the user COS data in the flash memory, adopting the flash memory as the carrier of the user COS data, the encryption algorithm, or the dynamic program, write the algorithm in which by oneself according to the requirement based on the character of the flash memory that can be written to repeatedly. Therefore, there is no need to provide the encryption algorithm and the code to the chip manufacturer. The security is enhanced, and makes the modification of the program during the development possible, so that the development period is dramatically shorten, the development time is saved, and the cost of development is decreased. Thus, the online upgrade and online programming of the smart card is realized.

The foregoing descriptions are preferred embodiments of the disclosure and are not intended to limit the claims of the disclosure. All equivalent structures or equivalent flow transformations made by making use of the content of the description and accompanying drawings of the disclosure, or direct or indirect application of them to other related technical fields all shall be within the protection scope of the disclosure.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A non-transitory computer readable storage medium having program instructions stored thereon, the program instructions comprising: a master control module, a memory control module, a nonvolatile memory and a cache, wherein the memory control module is connected with the master control module, the nonvolatile memory and the cache are respectively connected with the memory control module; and the memory control module is configured to, when the master control module sends a write command for the nonvolatile memory, store data to be written in the nonvolatile memory in the cache according to the write command, and release the cache used for storing the data to be written in the nonvolatile memory after finish of write operation to the nonvolatile memory;

wherein the memory control module comprises a cache control unit and a nonvolatile memory control unit;

the nonvolatile memory control unit is configured to receive the write command for the nonvolatile memory sent from the master control module, and send write operation information to the cache control unit according to the write command;

the cache control unit is configured to store the data to be written in the nonvolatile memory in the cache according to the write operation information;

the nonvolatile memory control unit is further configured to send a read command of reading the data stored in the cache to be written in the nonvolatile memory to the cache control unit;

the cache control unit is further configured to read the data stored in the cache to be written in the nonvolatile memory according to the read command, and send the read data to the nonvolatile memory control unit; and the nonvolatile memory control unit is further configured to send a notification signal indicating finish of writing the data in the nonvolatile memory to the cache control unit and the master control module after the data has been written into the nonvolatile memory, so as to release the cache used for storing the data to be written in the nonvolatile memory;

wherein the nonvolatile memory control unit comprises:

a nonvolatile memory write control sub-unit, configured to receive the write command for the nonvolatile memory from the master control module, and to send a write operation control signal; and a cache management sub-unit, configured to send a write operation information to the cache control unit according to the write operation control signal;

wherein the nonvolatile memory write control sub-unit is further configured to send the read command of reading the data stored in the cache to be written in the nonvolatile memory to the cache management sub-unit, so as to send the read command to the cache control unit through the cache management sub-unit;

wherein the cache control unit comprises:

a CPU command processing sub-unit;

a nonvolatile memory controller command processing sub-unit, configured to receive the write operation information and the read command;

an address management sub-unit, configured to receive the write operation information and an address configuration command of the cache used for storing the data to be written in the nonvolatile memory sent by the master control module when the master control module sends the write command for the nonvolatile memory, and to generate a cache address information of the cache for storing the data to be written in the nonvolatile memory according to the write operation information and the address configuration command;

a selection sub-unit, configured to select the cache address information, the write operation information and the read command received by the nonvolatile memory controller command processing sub-unit to send;

a cache write control sub-unit, configured to write the data to be written in the nonvolatile memory in the cache according to the cache address information and the write operation information sent from the selection sub-unit; and a cache read control sub-unit, configured to read the data stored in the cache to be written in the nonvolatile memory according to the read command sent from the selection sub-unit, and send the read data to the nonvolatile memory write control sub-unit;

wherein the cache management sub-unit respectively sends a notification signal indicating finish of writing the data in the nonvolatile memory to the selection sub-unit and the master control module after the nonvolatile memory write control sub-unit writes the data in the nonvolatile memory, so as to release the cache for storing the data to be written in the nonvolatile memory.

2. The non-transitory computer readable storage medium as recited in claim 1, wherein at least a part of the cache is pre-determined cache or random allocated cache.

3. The non-transitory computer readable storage medium as recited in claim 2, wherein the cache is at least a part of pre-determined system RAM or random allocated RAM.

4. The non-transitory computer readable storage medium as recited in claim 3, wherein the program instructions further comprises a security protocol processor, the cache further serves as an algorithm RAM;

the CPU is configured to use the algorithm RAM as system RAM when the security protocol processor is in an idle state, conduct read/write operation processing to the data according to instructions, store instruction information in the system RAM, send the processed instruction information in the system RAM to the security protocol processor, and store the instruction information in the algorithm RAM; and the algorithm RAM is configured to analyze the received instruction information and conduct generation of data packet, encryption and decipherment.

5. The non-transitory computer readable storage medium as recited in claim 3, wherein the program instructions further comprises a security protocol processor and an algorithm RAM;

the CPU is configured to use the algorithm RAM as the system RAM when the security protocol processor is in an idle state, conduct read/write operation processing to the data according to instructions, store instruction information in the system RAM, then send the processed instruction information in the system RAM to the security protocol processor, and store the instruction information in the algorithm RAM; and the algorithm RAM is configured to analyze the received instruction information and conduct generation of data packet, encryption and decipherment.

6. The non-transitory computer readable storage medium as recited in claim 3, wherein the storage medium is adopted in a smart card.

7. The non-transitory computer readable storage medium as recited in claim 4, wherein the storage medium is adopted in a smart card.

8. A method for controlling a nonvolatile memory system comprises a master control module, a memory control module, a nonvolatile memory and a cache, wherein the memory control module is connected with the master control module, the nonvolatile memory and the cache are respectively connected with the memory control module; the method comprises steps of:
- when the master control module sends a write command for the nonvolatile memory, storing data to be written in the nonvolatile memory in the cache according to the write command by the memory control module, and releasing the cache used for storing the data to be written in the nonvolatile memory after finish of write operation to the nonvolatile memory;
- wherein the memory control module comprises a cache control unit and a nonvolatile memory control unit;
- the nonvolatile memory control unit receives the write command for the nonvolatile memory sent from the master control module, and sends write operation information to the cache control unit according to the write command;
- the cache control unit stores the data to be written in the nonvolatile memory in the cache according to the write operation information;
- the nonvolatile memory control unit sends a read command of reading the data stored in the cache to be written in the nonvolatile memory to the cache control unit;
- the cache control unit reads the data stored in the cache to be written in the nonvolatile memory according to the read command, and sends the read data to the nonvolatile memory control unit; and
- the nonvolatile memory control unit sends a notification signal indicating finish of writing the data in the nonvolatile memory to the cache control unit and the master control module after the data has been written into the nonvolatile memory, so as to release the cache used for storing the data to be written in the nonvolatile memory;
- wherein the nonvolatile memory control unit comprises a nonvolatile memory write control sub-unit and a cache management sub-unit,
- the nonvolatile memory write control sub-unit receives the write command for the nonvolatile memory from the master control module, and sends a write operation control signal; and
- the cache management sub-unit sends a write operation information to the cache control unit according to the write operation control signal; and
- the nonvolatile memory write control sub-unit sends the read command of reading the data stored in the cache to be written in the nonvolatile memory to the cache management sub-unit, so as to send the read command to the cache control unit through the cache management sub-unit;
- wherein the cache control unit comprises a CPU command processing sub-unit, a nonvolatile memory controller command processing sub-unit, an address management sub-unit, a selection sub-unit, a cache write control sub-unit, and a cache read control sub-unit;
- the nonvolatile memory controller command processing sub-unit receives the write operation information and the read command;
- the address management sub-unit receives the write operation information and an address configuration command of the cache used for storing the data to be written in the nonvolatile memory sent by the master control module when the master control module sends the write command for the nonvolatile memory, and generates a cache address information of the cache for storing the data to be written in the nonvolatile memory according to the write operation information and the address configuration command;
- the selection sub-unit selects the cache address information, the write operation information, and the read command received by the nonvolatile memory controller command processing sub-unit to send;
- the cache write control sub-unit writes the data to be written in the nonvolatile memory in the cache according to the cache address information and the write operation information sent from the selection sub-unit;
- the cache read control sub-unit reads the data stored in the cache to be written in the nonvolatile memory according to the read command sent from the selection sub-unit, and sends the read data to the nonvolatile memory write control sub-unit; and
- the cache management sub-unit respectively sends a notification signal indicating finish of writing the data in the nonvolatile memory to the selection sub-unit and the master control module after the nonvolatile memory write control sub-unit writes the data in the nonvolatile memory, so as to release the cache for storing the data to be written in the nonvolatile memory.

9. The method as recited in claim 8, wherein
at least a part of the cache is pre-determined cache or random allocated cache.

10. The method as recited in claim 9, wherein
the cache is at least a part of pre-determined system RAM or random allocated RAM.

11. The method as recited in claim 10, wherein the memory system further comprises a security protocol processor, the cache further serves as an algorithm RAM;
- the CPU uses the algorithm RAM as system RAM when the security protocol processor is in an idle state, conducts read/write operation processing to the data according to the instructions, stores instruction information in the system RAM, then sends the processed instruction information in the system RAM to the security protocol processor, and stores the instruction information in the algorithm RAM; and
- the algorithm RAM analyzes the received instruction information and conducts generation of data packet, encryption and decipherment.

12. The method as recited in claim 10, wherein the memory system further comprises a security protocol processor and an algorithm RAM;
- the CPU uses the algorithm RAM as the system RAM when the security protocol processor is in an idle state, and conducts read/write operation processing to the data according to the instructions, stores the instruction information in the system RAM, then sends the processed instruction information in the system RAM to the security protocol processor, and stores the instruction information in the algorithm RAM; and
- the algorithm RAM analyzes the received instruction information and conducts generation of data packet, encryption and decipherment.

13. The method as recited in claim 10, wherein the memory system is adopted in a smart card.

14. The method as recited in claim 11, wherein the memory system is adopted in a smart card.

* * * * *